O. BOYER.
TRACTION WHEEL.
APPLICATION FILED MAY 5, 1916.
1,202,786.
Patented Oct. 31, 1916.
2 SHEETS—SHEET 1.
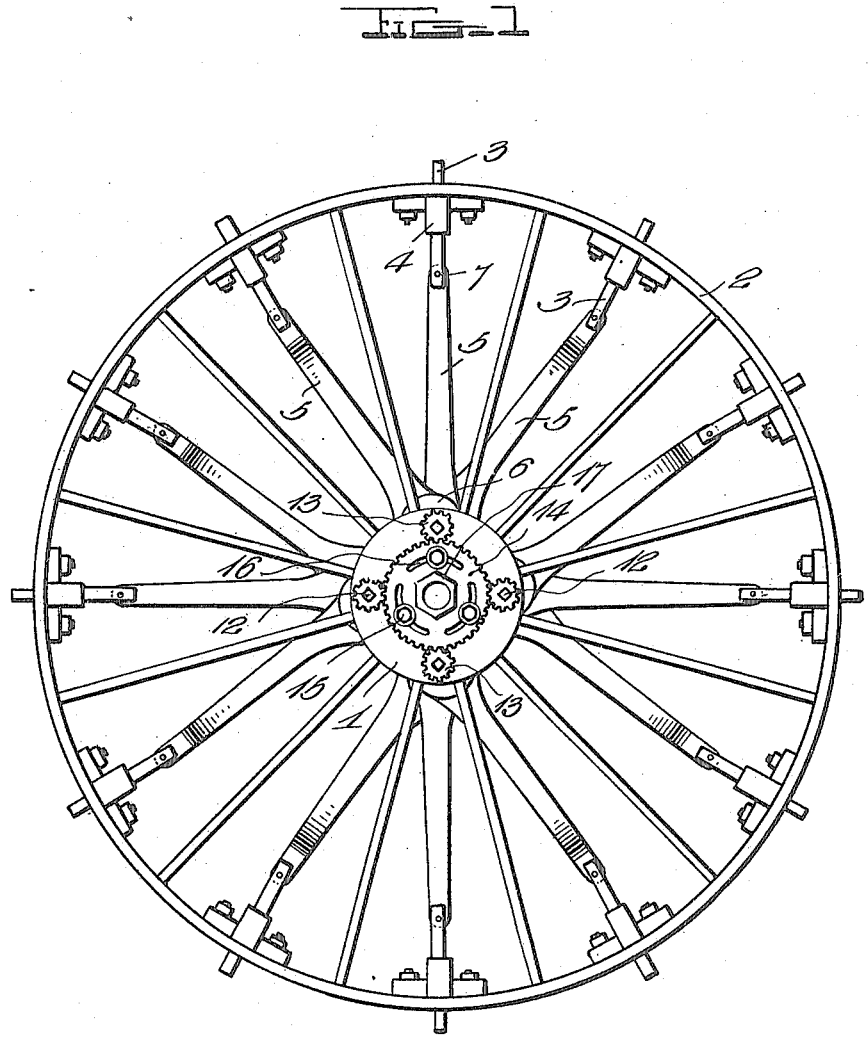
Inventor
Oliver Boyer
By
Attorney O. BOYER.
TRACTION WHEEL.
APPLICATION FILED MAY 5, 1916.
1,202,786.
Patented Oct. 31, 1916.
2 SHEETS—SHEET 2.
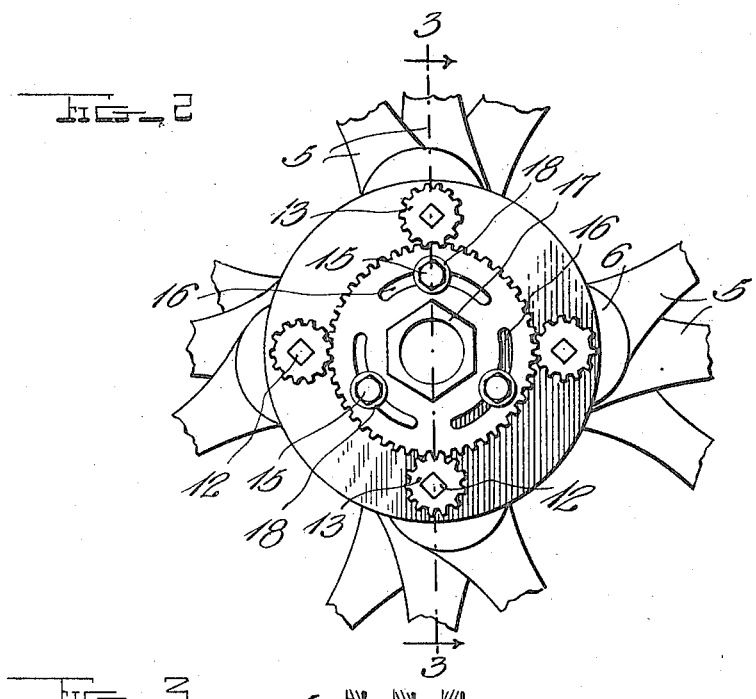
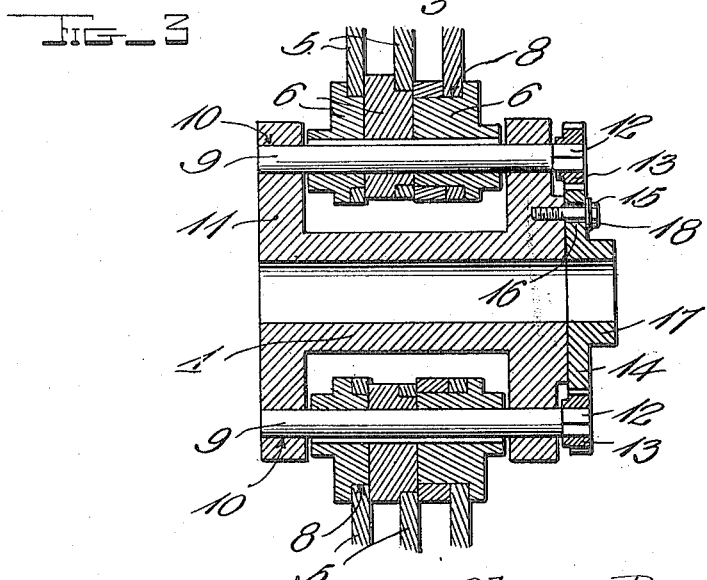
Inventor
Oliver Boyer
By
Attorney

UNITED STATES PATENT OFFICE.

OLIVER BOYER, OF SPENCERVILLE, OHIO.

TRACTION-WHEEL.

1,202,786.  Specification of Letters Patent.  Patented Oct. 31, 1916.

Original application filed February 17, 1916, Serial No. 78,881. Divided and this application filed May 5, 1916. Serial No. 95,562.

*To all whom it may concern:*

Be it known that I, OLIVER BOYER, a citizen of the United States, residing at Spencerville, in the county of Allen and State of Ohio, have invented certain new and useful Improvements in Traction-Wheels, of which the following is a specification.

This invention relates to new and useful improvements in traction wheels of the character shown in my co-pending application, filed February 17th, 1916, Ser. No. 78,881, of which this application is a division and has for its object to provide a traction wheel in which all of the spurs or tractors may be simultaneously adjusted and whereby a more minute adjustment of the spurs or tractors may be had.

With the foregoing and other objects in view which will appear as the nature of the invention is better understood, the same consists in the novel features of construction, combination and arrangement of parts illustrated in the drawings and more particularly pointed out in the appended claims.

In the accompanying drawings: Figure 1 is a side elevation of a traction wheel embodying my improvements. Fig. 2 is a detail fragmentary side elevation with the parts shown on an enlarged scale and Fig. 3 is a vertical transverse section taken on the plane indicated by the dotted lines 3—3 of Fig. 2, looking in the direction indicated by the arrows.

Referring to the drawings for a more particular description of the invention and in which drawings like parts are designated by like reference numerals throughout the several views, 1 indicates the hub, 2 the rim and 3 the spurs or tractors of a traction wheel embodying my improvements. As shown, the spurs or tractors work through the guide bearings 4 bolted or otherwise secured to the inner edge or perimeter of the rim 2 and also through corresponding slots or openings in the rim as shown in Fig. 1.

The spurs or tractors are projected or retracted by the radially disposed connecting links 5 and the eccentrics 6, said connecting links being loosely or pivotally connected at their outer ends, as at 7, with the inner ends of the spurs or tractors and having enlarged inner ends formed with suitable openings 8 to receive the eccentrics.

The eccentrics are keyed or splined to the transverse shafts 9 mounted to turn in the transverse openings 10 in the annular flanges 11 formed at opposite ends of the hub 1. The outer ends of the shafts 9 are provided with square extensions 12 on which are arranged the pinions 13 which intermesh with the teeth of the central operating gear wheel 14 mounted for partial rotation on the outer end of the hub 1 by the bolts 15 which pass through corresponding arcuate slots 16 in said gear wheel and screw into the hub 1. Said operating gear wheel 14 is provided with a polygonal head or portion 17, which may be hexagonal or square as desired and which is adapted to be engaged by a wrench in turning the gear wheel to project or retract the spurs. To adjust the spurs or tractors, the bolts 15 are loosened or partly unscrewed and after turning the operating gear wheel to the desired position or point, the bolts are again tightened against the clamping washers 18.

It will be observed that by the mechanism or means which I employ all of the spurs or tractors may be simultaneously adjusted while a more minute adjustment of the spurs may be had than heretofore possible.

In the present embodiment, I have shown a traction wheel with twelve spurs or tractors and a corresponding number of connecting links 5 of course with four transverse shafts 9, the connecting links being connected to the shafts 9 in threes, that is, three links being actuated by each shaft. In practice, however, I claim the right to use a greater or less number of spurs or tractors as desired or to meet the exigencies of any particular case and connect the links with the transverse shafts in pairs, threes or fours as desired.

From the foregoing description taken in connection with the drawings, it is thought that the construction and operation of this invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:—

1. A traction wheel having spaced apertures in its rim, spurs or tractors working through said apertures, eccentric shafts journaled to the wheel hub, each shaft being equipped with a plurality of eccentrics and adapted to simultaneously actuate a corresponding number of spurs, radial links pivotally connected to the inner ends of the spurs and having openings at their inner ends to receive the eccentrics of said shafts, a gear wheel rotatably mounted on the outer end of the hub, said gear wheel having a central wrench engaging portion and pinions applied to the outer ends of the eccentric shafts and intermeshing with the teeth of said gear wheel whereby all of the eccentric shafts may be turned in their bearings at the same time to simultaneously project or retract all of the spurs or tractors by partially rotating the gear wheel.

2. A traction wheel having spaced apertures in its rim, spurs or tractors working through said apertures, eccentric shafts journaled to the wheel hub, each shaft being equipped with a plurality of eccentrics and adapted to simultaneously actuate a corresponding number of spurs, radial links pivotally connected to the inner ends of the spurs and having openings at their inner ends to receive the eccentrics of said shafts, a gear wheel rotatably mounted on the outer end of said hub and having a wrench engaging portion, pinions applied to the outer ends of said eccentric shafts and intermeshing with the teeth of said gear wheel whereby all of the eccentric shafts may be turned in their bearings at the same time to simultaneously project or retract all of the spurs or tractors by partially rotating the gear wheel and means for operatively supporting the gear wheel in position and for holding or securing it in adjusted position, comprising clamping bolts passing through arcuate slots in the gear wheel and screwing into the outer end or face of the hub.

In testimony whereof I affix my signature in the presence of two witnesses.

OLIVER BOYER.

Witnesses:
 FRANCIS GEORGE,
 MYRTLE PRENTICE.

Copies of this patent may be obtained for five cents each, by addressing the "Commissioner of Patents, Washington, D. C."